United States Patent [19]

Sing

[11] Patent Number: 4,784,215

[45] Date of Patent: Nov. 15, 1988

[54] THERMAL INSULATING SHADES

[76] Inventor: Peter Sing, 43 Donny Brook Rd., Scarsdale, N.Y. 10583

[21] Appl. No.: 893,009

[22] Filed: Aug. 1, 1986

[51] Int. Cl.4 .......................... A47H 5/00; E06B 3/94; F24J 2/36

[52] U.S. Cl. ........................................ 165/41; 165/46; 165/47; 126/426; 126/429; 160/DIG. 2; 160/370.2; 296/95.1

[58] Field of Search ............ 160/84 R, 368 S, DIG. 2, 160/DIG. 3; 126/426, 449, 429, 431; 165/46, 47, 41; 296/95 C, 97 C, 97 D

[56] References Cited

U.S. PATENT DOCUMENTS

| | | | |
|---|---|---|---|
| 2,874,612 | 2/1959 | Luboshez | 160/84 R |
| 4,020,826 | 5/1977 | Mole | 126/449 |
| 4,054,125 | 10/1977 | Eckels | 126/449 |
| 4,182,307 | 1/1980 | Brindle et al. | 126/426 |
| 4,202,396 | 5/1980 | Levy | 160/84 R |
| 4,399,347 | 8/1983 | Schmitt | 160/DIG. 2 |
| 4,442,881 | 4/1984 | Monteath et al. | 160/DIG. 3 |
| 4,535,828 | 8/1985 | Brockhaus | 160/84 R |
| 4,671,334 | 6/1987 | Yadegar et al. | 160/84 R |

FOREIGN PATENT DOCUMENTS

0004455 10/1979 European Pat. Off. ......... 160/84 R

Primary Examiner—Albert W. Davis, Jr.
Assistant Examiner—John K. Ford
Attorney, Agent, or Firm—Nathaniel Altman

[57] ABSTRACT

A thermal insulating shade is made up of a plurality of panels, spaced apart and defining a serpentine air flow path between them. A blower connected to the air flow path ventilates the shade to augment its insulating effect. As least one of the panels has a highly reflective surface to reflect heat. The shade is reversible and removable and useful for insulating building windows and vehicle windows and windshields.

9 Claims, 6 Drawing Sheets

THERMAL INSULATING SHADES

FIELD OF THE INVENTION

This invention relate to shades for use in autos and the rooms of buildings to combat the heat of summer and the cold of winter coming through windows, as well as to novel umbrellas for use in the interior of automobiles that are left outside in the sun.

The term shade is used in this case to include interior covers, and vice versa. When used for a window, the term shade seems appropriate; while in the case of automobile roofs, the term interior cover is more apt, but the function in both cases is to reject heat with respect to a closed air space, by acting as a blind and/or heat insulator. In winter when a shade is reversed, it still acts as a shade to reflect heat back into the room, thereby helping to keep the room warm.

DESCRIPTION OF THE PRIOR ART

Automobiles, when left out i the heat of summer, get extremely hot. Buildings also get very hot on account of the "hot house" effect of closed windows. In the winter buildings lose considerable heat because of the windows. This is not only uncomfortable but expensive.

Shades for windows are known that have reflective surfaces for counteracting such troubles, by reflecting heat outwardly in the summer. Such prior art shades are not very efficient, leaving room for improvement. The main object of this invention is to provide a highly efficient shade that also serves, when reversed, as a heat collector in the winter by virtue of its novel construction.

Another object is to provide a hollow internally air cooled shade that is more effective and efficient than those of the prior art.

SUMMARY OF THE INVENTION

A shade is provided that basically comprises spaced panels that form an air space therebetween with a heat reflective surface on at least one of such panels. Thus when the shade is removably mounted with such reflective surface facing a window, for example, heat is reflected away from such window. By reversing the shade, heat is collected, helping to keep the room warm. In either case the air space between the panels assists in the summer by keeping the room cooler, and by keeping the room warmer in winter.

The air space may be in the form of a maze, or closed. The maze may be designed to circulate air through the space to sweep over as much surface as possible within the unit. Suction cups, or releasable adhesive spacers may be used to mount the shade in spaced relation to a window, so that the reflective surface faces in the desired direction, one way for summer and the other way for winter.

The invention provides for an interior shade for automobiles, for example. In such case, the shade is composed of an envelope of flexible material such as polyester plastic having a reflective surface on each panel, that faces the sunny side of the shade in use. The envelope is filled with air that may be static, or in some cases air may be circulated through the envelope. Another form of the invention provides inner and outer envelopes and means for circulating cold air through one envelope and hot air through the other as may be desirable for the highest efficiency of the shade. The air source may come from the auto itself, or from an auxiliary source. The auxiliary air source may be a compressor driven by the car battery which is, in turn, energized by a solar cell energy source. Means may be provided for alternating the direction of air movement through the shade as may be desired for best results.

While the device of the invention is referred to as a shade, it also functions as a heat collector when its normal use as a sun-ray reflector is reversed, so that heat from within a room is reflected back into such room, and sunlight is trapped within the device to thereby help heat the interior of the room.

The invention includes the combination of the novel shade with means for circulating air through the interior thereof to improve the desired operation of the shade in dissipating unwanted heat; as well as for collecting desired heat when so used.

DESCRIPTION OF THE PREFERRED EMBODIMENTS

Figure 1:
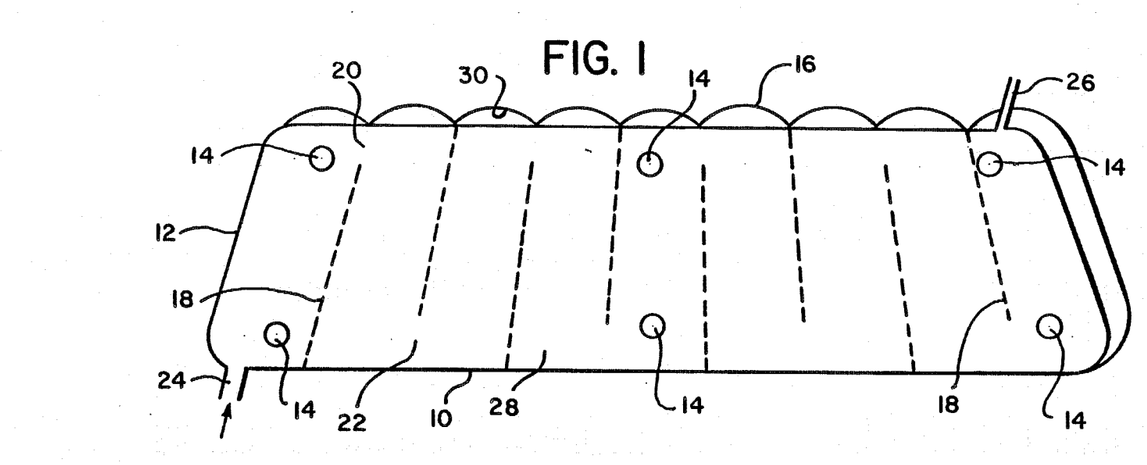
FIG. 1 is a view in schematic perspective of an air auto window shade illustrative of the invention.

Referring to FIG. 1, there is shown an auto window shade 10 composed of a panel 12 shaped like the window with which is to be used. The panel is provided with releasable vacuum cups 14 for holding the panel 12 in spaced relationship to such window. Adhesive-bearing members that are releasable may be used in place of the vacuum cups. Carried by one side of panel 12 is a backing 16 of flexible material, such as polyester plastic, that is connected to the panel 12 in such a way by longitudinally spaced vertical lines 18 of adhesive or stitching which alternately end short of the top and bottom of the unit 10. Thus, ways 20 and 22 are left open for passage of air through the unit 10, as stir which enters inlet 24 circulates up and down through the unit until such air reaches exit 26. One side of at leat one of the panel 12 and backing 16 is provided with a highly reflective surface 28 and 30. Both of such surfaces 28 and 30 face in the same direction; normally toward the sunny side. Thus, heat from the outside of the car is reflected outwardly, giving a double shading effect. At the same time, air within the unit, if uncirculated, acts as a heat insulator. If such air is circulated an even greater insulator is present.

Figure 2:
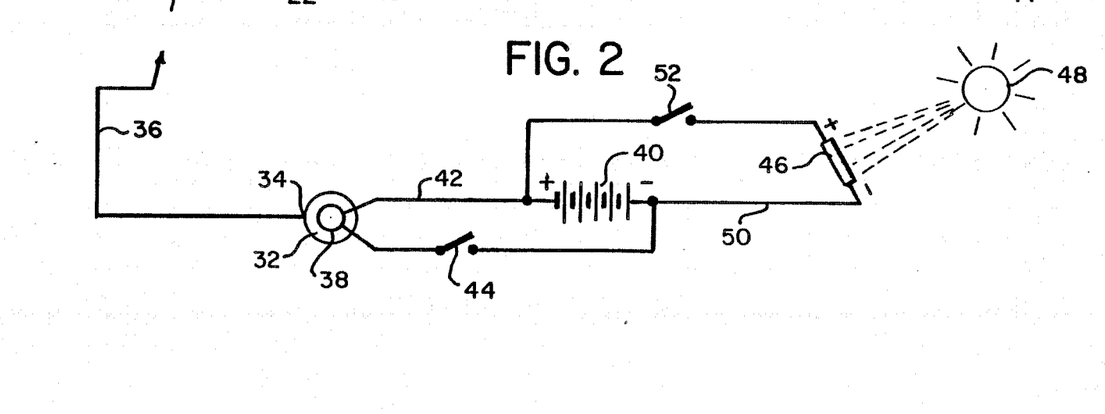
FIG. 2 is a circuit diagram of an air supply system for such shade.

FIG. 2 shows an air circulating system including an air blower or pump 32 the outlet 34 of which goes to the air inlet 24 of unit 10 by way of a hose 36. The air blower is driven by a motor 38 which is energized by a battery 40, which may be that of the auto, through an electric circuit 42 containing an "on-off" switch 44. Charge of battery 40 is maintained by a solar cell generator 46 which is energized by the sun 48, in circuit 50 that also contains an "on-off" switch 52. Thus, when air blower 32 is turned on, air is circulated through the shade 10 from top to bottom and from one end to the other, keeping the shade cool.

In the winter, in case of an emergency with the ambient temperature very low, the interior space of the car can be kept warm by turning the shade 10 around so that the unit acts as a heat collector which helps to warm the inside of the car. In such case the unit collects heat from the outside, and reflects any heat from within the car back to the inside thereof. Also, if desired the heat so collected warms air circulated through the unit, the resulting warm air being expelled into the interior of the car.

Figures 3, 4:
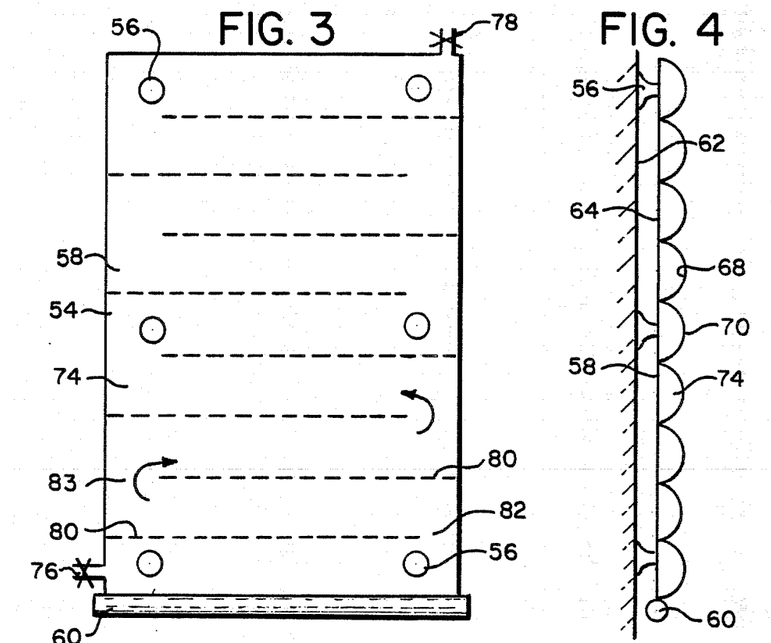
FIG. 3 is a view in elevation of a window shade for a building embodying a modification of the invention.
FIG. 4 is a side view of such shade.

A somewhat modified shade 54 of the invention is shown by FIGS. 3 and 4 in which the unit is rectangular for use adjacent the window of a building which also is rectangular. Suction cups 56 are carried by the flat panel 58 having a tubular bottom member 60, for releasably securing the shade 54 in spaced parallel relation to the window 62 in the wall of a building, such as a house, for example. When the shade is in use to help keep the room cool, surfaces 64 and 68 facing the window 62, of the flat panel 58 and quilted panel 70 are highly reflective. In the winter, the shade's position with respect to the window 62 is reversed, to reflect heat back into the room. The air space 74 between the panels 54 and 70 is closed to provide dead air insulation therebetween; or air can be circulated through such space 70 which follows back and forth cross paths as the air moves from one end of the shade 54 to the other from an air inlet 76 to outlet 78; formed by cross switching lines that alternately end short of the side walls of the panel 54, to leave openings 82 and 83 therebetween.

Figure 6:
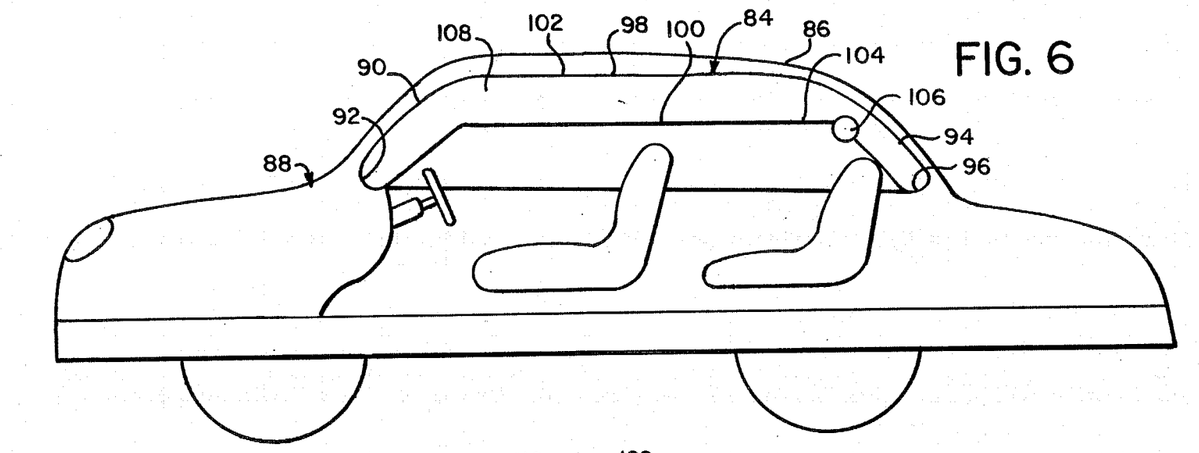
FIG. 6 is a schematic view of an auto equipped with a modified shade of the invention.

FIG. 6 shows an internal cover 84 of the invention to help keep the interior of an automobile cool even when parked in the hot sun of summer. The interior cover 84 is an envelope filled with hollow foam shaped to fit under the roof 86 of the automobile 88 in spaced relation thereto, with the fore part 90 resting on front shelf 92; and the rear part 94 resting on the deck cover 96. The interior cover shade envelope is composed of flexible material, such as polyester plastic, with the upper surfaces 98 and 100 of the spaced panels 102 and 104 having a highly reflecting coating. The interior thermal shade 84 is held up in place by tubular cross support 106 located under the rear bend of the unit 84. The thermal shade 84 is filled with a suitable gas, such as air, which holds the device in the desired shape in use. In use the interior cover acts as a double shade with an insulating air space 108 between the upper panel 102 and lower panel 104, the reflective surfaces 98 and 100 of which improve the shading efficiency of the device. In this way the thermal shade keeps cool the interior of car 88 even in the hot sun.

Figure 7:
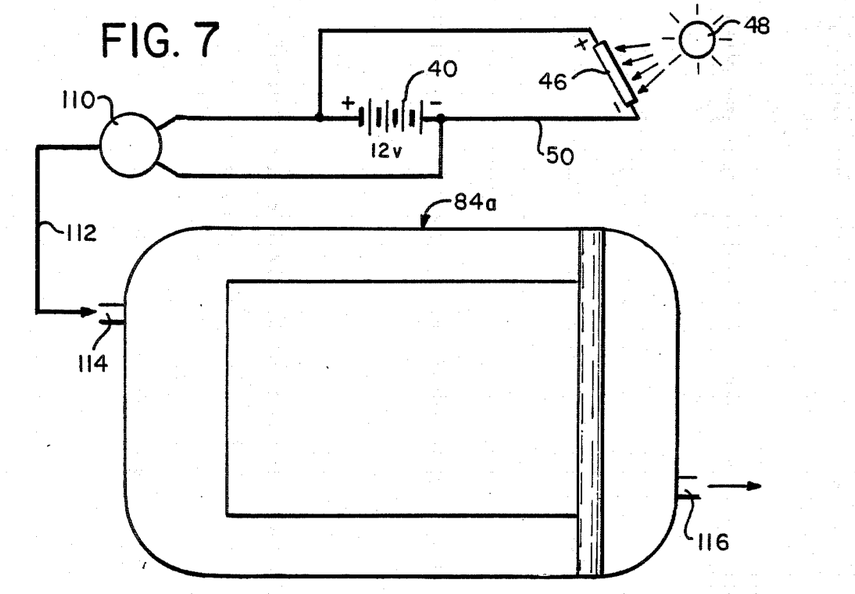
FIG. 7 is a view partly in plan of the shade, and partly diagrammatic of the air supply system.

Air is circulated through the thermal shade 84a in the modification of FIG. 7, by air under pressure that is supplied by an air blower 110 through an air hose 112 that is connected to an air inlet 114 located at one end of unit 84a. After moving through the inside of the thermal cover, the air circulated through the unit, exits at 116, keeping cool the interior of the thermal shade 84a.

As explained above, re: FIG. 2, the motor of air blower 110 is operated by the battery 40, the energy of which is supplemented by an auxiliary charging circuit 50. Such circuit 50 contains a solar cell battery 46 that is exposed to the rays of the sun 48. Air moving through the inside of the unit 84a, thus, keeps the thermal cover cool which, in turn, keeps the interior of the car cool.

Figure 8:
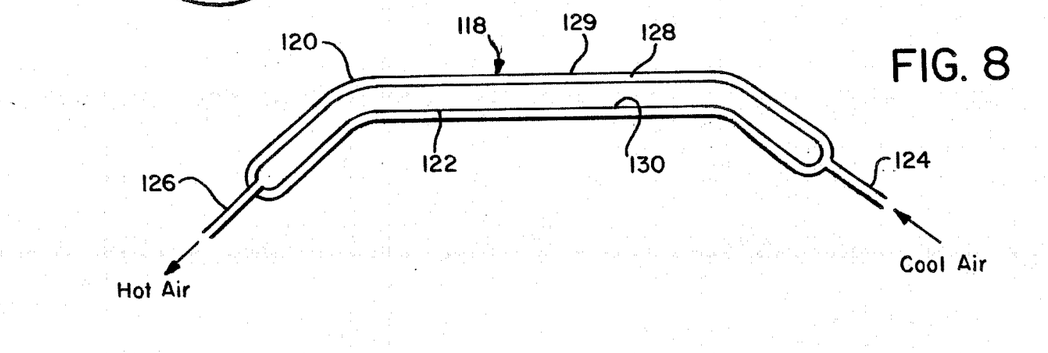
FIG. 8 is a view in cross section of a double envelope modification of the shade of the invention.

In FIG. 8, the thermal cover or shade 118 includes an outer balloon 120 of flexible material within which is located an inner balloon 122 also of flexible material. The balloons 120 and 122 are similarly shaped like, for example, the roof of an auto body as in FIGS. 6 and 7, when filled with air under pressure. In use cool air enters the thermal cover via inlet 124, and hot air exits through exit 126. The inner balloon 122 may be perforated, and semi-rigid, so that cool air entering one end at 124 circulates through the space 128 between the balloons 120 and 122, removing hot air which enters inner balloon 122 through the perforated walls thereof. The resulting relatively hot or warm air leaving the unit 118 via exit 126 which is connected to the other end of the inner balloon 122. As in the case of FIG. 6, the upper surfaces 129 and 130 of the balloons are provided with a highly reflective coating, facing the natural source of heat, such as the sun. This results in a highly efficient shade, combining as it does double reflection, as well as double insulation.

Figures 9, 10:
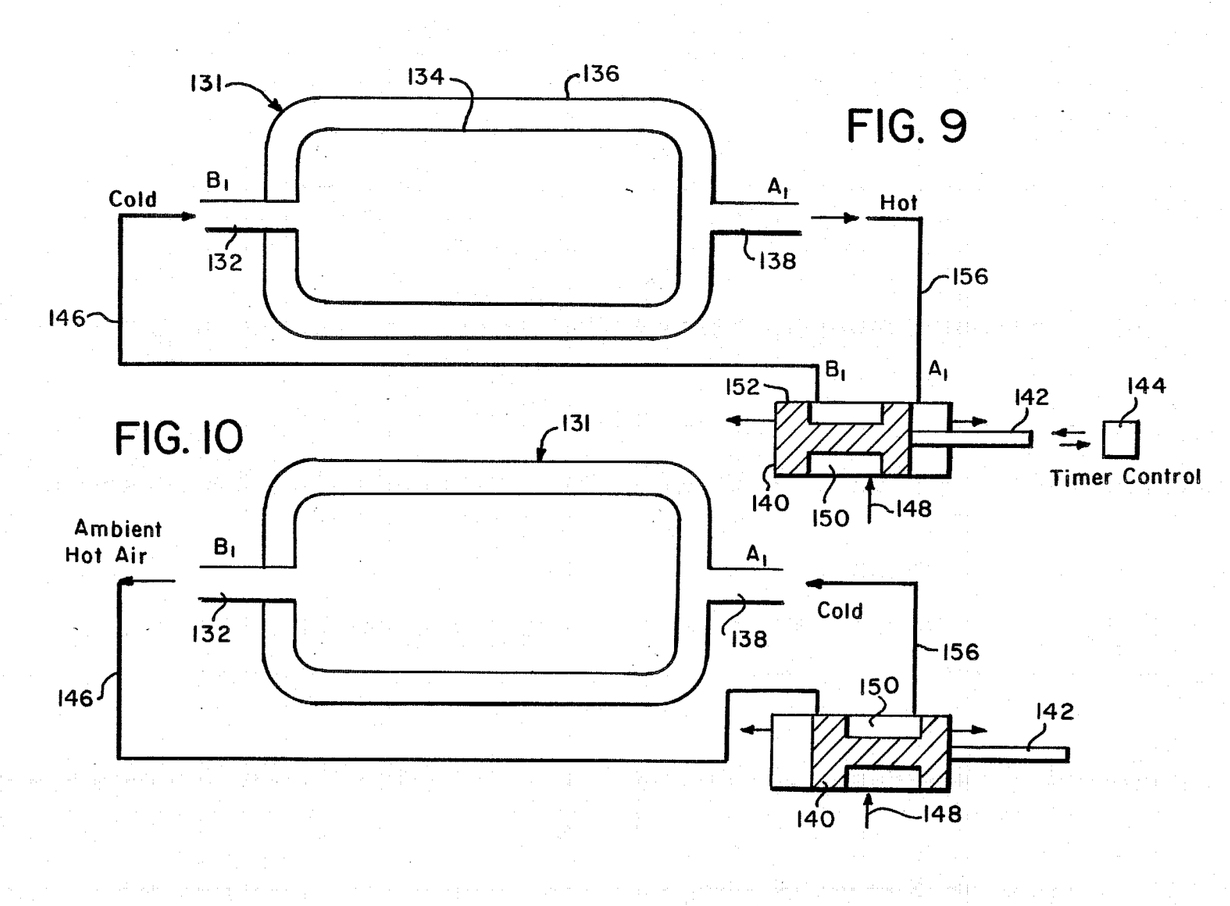
FIGS. 9 and 10 are diagrammatic views of a similar modification hooked up to an air supply.

An air circulation system is shown in FIGS. 9 and 10, in which air is circulated through separate air ways of a shade 131 made of flexible material comprising concentric envelopes with openings facing in opposite directions. In FIG. 9, cold air is supplied through inlet 132 to inner envelope 134 that is located within but in spaced relationship to outer envelope 136. Such outer envelope 136 is provided with an air exit 138 at the opposite end of the unit 131. An air direction reversing valve 140 having a stem 142 is provided in the air system of the device. The stem 142 is connected to a timer 144 which first connects the inlet 132 through a hose 146 to a source of cold air 148 via an annular air passage way 150 in the valve piston 152. At the same time, hot air is discharged from exit 138 via a hose 156.

At a preselected time interval, timer 144 moves the valve piston 150, FIG. 10, so that the air flow is reversed, by connecting former exit 138 to be an air inlet, by putting the valve piston air way 150 in air line 156 with the air source 148. At the sme time air inlet 132 is changed to be an air outlet which discharges hot air from the unit via air line 146. Air flow to and from the shade 131, thus, is alternately reversed, thereby increasing the cooling function of the device.

Figure 11:
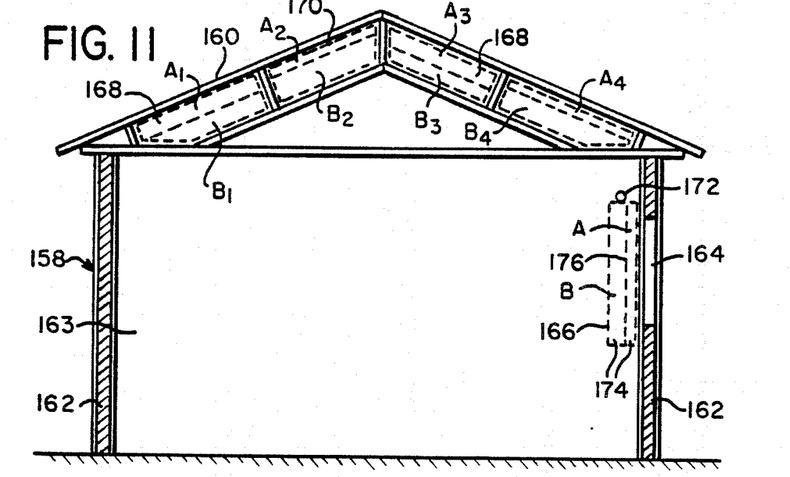
FIG. 11 is a view in cross section of a building involving a sandwich type modification of the invention.

In FIG. 11 there is shown a building 158 having a roof 160 supported by walls 162 providing a room 163. One wall 162 contains a window 164. Mounted in spaced relation to the window 164 is a shade 166, such as a curtain or drape, embodying yet another modification of the present invention. Shades 168 similar to 166 are mounted directly under the roof 160. The shades 168 are provided with corner frames 170, while the shade 166 may be hung on a curtain rod 172. The construction of shade 166, for example, comprises "siamese" bags 174 having a common panel 176. At least one surface of the bag panels 176, 178 and 180 are provided with a highly reflective coating 182 which faces outwardly of the room 163 in winter, and inwardly thereof in summer.

The shade 166 (see FIGS. 13, 14) comprises side-by-side air sacks A and B having air openings 184, 186 at one end thereof for the alternate entrance and exit of air via air hoses 188 and 190 that are connected to an air pressure-vacuum device 192, which when activated causes air alternately to be evacuated from one sack, while supplying air to the other sack. The air pressure/vacuum device 192 is energized by a battery circuit 194 having a storage battery 196 energized, in turn, by a photovoltaic or solar cell circuit 198 containing a solar cell battery 199 that is energized by the sun 200.

Figures 12, 14:
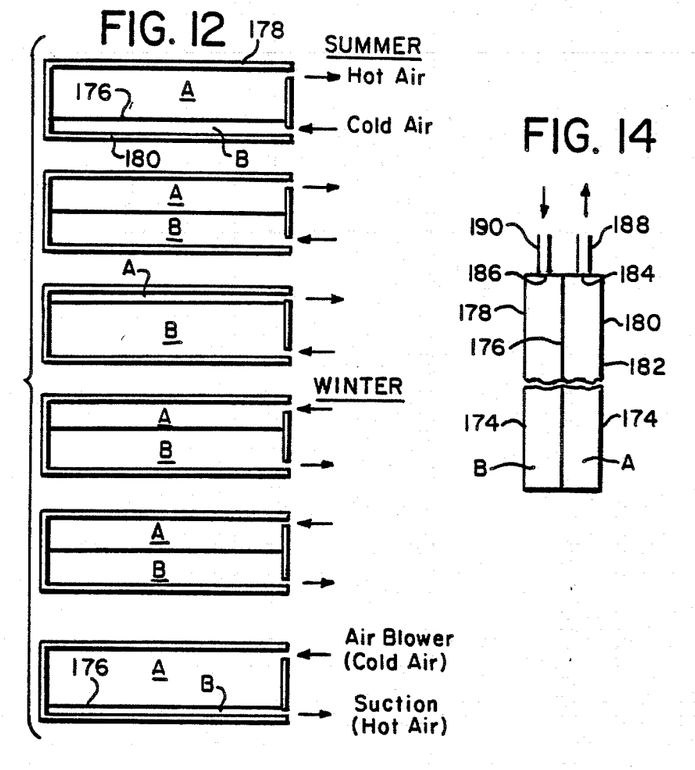
FIG. 12 is a schematic view illustrating the operation of the shades of FIG. 10.
FIG. 14 is a view in side elevation of the sandwich type panel.
Figure 13:
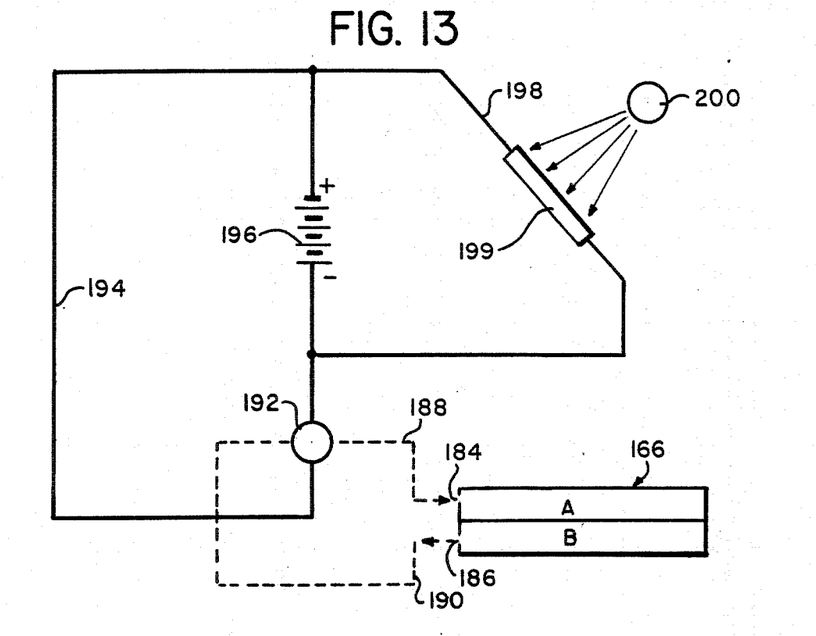
FIG. 13 is a circuit diagram of the air circulation system therefor.

The system works in such a manner that first one sack A is filled with air while the other sack B is evacuated, as shown in FIG. 12. The cycle is then reversed, causing common panel 176 to, in effect, close one sack to be emptied of the other while the other is filled. Actually one bag collapses as the other is filled and vice versa. Thus, the shade 166 acts as a thermal curtain when hung as a drape near a window, due to the so circulated air in and out of the adjoining sacks, which is implemented by the reflection action of the reflective surface facing the window. Reversal of the shade, helps keep heat within the room.

The shade keeps the room cool in summer; and, when reversed, keeps such room warm in winter.

It will be apparent to those skilled in the art that changes may be made in the disclosed embodiments without departing from the spirit of the invention or from the scope of the following claims.

Figure 5:
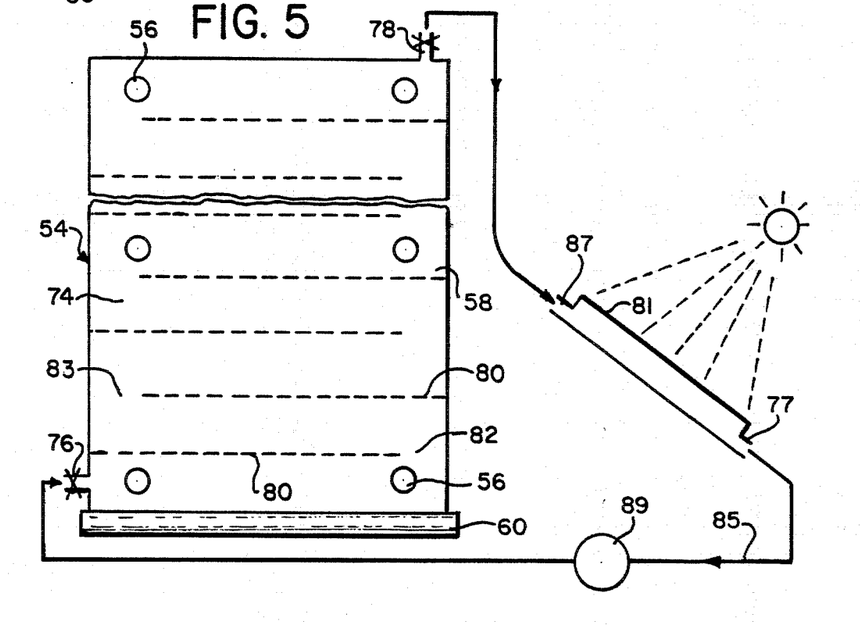
FIG. 5 is a view partially in plan of the shade of FIGS. 3, 4 and partially diagrammatic of a system including a solar collector, for supplying warm air to the shade.

In FIG. 5 the air inlet 76 of a shade 54 according to the invention is connected to the output 77 of a solar panel or collector 81 by a hose 85, while the air outlet 78 of the shade is connected to the input 87 of the solar panel. An air pump or fan 89 may be connected along the length of one of the hoses to circulate air through the circuit. As noted, in winter, to assist in heating, the reflective surfaces of the panels face inwardly. The outwardly facing surfaces can be covered with a material which absorbs radiant energy. Alternatively, the panel may be a polyester which permits a portion of the sunlight to penetrate the assist in warming and lighting the room. It is possible to connect several shades in series in the circuit of FIG. 5 (or in series-parallel combinations) to fully exploit the energy collected by the solar panel. In view of the use of a shade according to the invention for both cooling in the summer and heating in the winter, the term "cool" or "cooling" as used in the claims may be construed to also encompass "hot" or "heating".

I claim:

1. Thermal insulating shade to be placed adjacent to and substantially overlaying the interior surface of an area to be insulated, the exterior surface of said area being exposed to variable weather conditions including sun's heat and winter's cold, the thermal insulating shade being both reversible and removable and comprising:

a plurality of panels, at least one of which has a highly reflective surface on one side thereof, said panels being shaped to conform in size and shape to the interior surface of the area to be insulated;

means for supporting said panels in spaced, substantially parallel relationship to each other to provide air space therebetween;

means for releasably mounting said plurality of panels in substantially parallel spaced relationship to the interior surface of the area to be insulated, so that one side of the thermal shade is insulated from the heat or cold prevailing on the other side thereof by reflection of said highly reflective surface, as well as by the insulating effect of said air space between said panels; and means for circulating air through said air space to increase the insulative effect of the thermal shade, said air space being divided into a path for the flow of air provided between said panels, said path being longer than the distance from one end to the other of said panels, said path being provided by attaching each of said panels to its adjacent panel in parallel spaced lines to form air passages therebetween in such a way that each of said spaced attachment lines are terminated short of alternately opposite edges of the thermal shade, leaving openings for the passage of air from one said air passage to the next at alternating edges of the thermal shade.

2. A thermal shade as defined by claim 1, wherein said means for circulating air comprises a blower for causing air flow through said longer air path from one end of the shade to the other thereby to improve the insulating ability of the shade.

3. A thermal shade as defined by claim 1, wherein said means for circulating air through the shade further comprises:

air inlet means and air outlet means located at opposite ends of the shade;

said air blower being operatively connected to supply air to said air inlet means;

a motor for driving said air blower;

storage battery means connected to said motor by a circuit containing a first actuating switch for energizing said motor when said first switch is closed; and an auxiliary battery-charging circuit for said battery, including which comprises:

a second actuating switch; and a solar cell battery for energizing said storage battery when said second actuating switch is closed.

4. A thermal shade as defined by claim 1, for shielding a confined area from the sun's heat, further comprising:

means for supplying cool air to said air space between said plurality of panels of the thermal shade positioned in the confined area, which comprises:

an air blower;

a motor to actuate said blower; and circuit means including a solar cell battery for connecting and for energizing said air blower and said motor to supply cool air to the shade, whereby air in the confined area that tends to be heated by the sun is, in effect, also cooled by virtue of energy derived from the sun, as well as by reflection of the sun's rays away from the confined area by said highly reflective surface on said plurality of panels of the thermal shade.

5. A thermal shade in accordance with claim 1, wherein said at least one highly reflective surface may be positioned to face outwardly in hot weather to reflect away the heat of the sun, and wherein the shade may be reversed in cold weather so that said at least one highly reflective surface faces inwardly to reflect the interior warmth to the inside, said air space between said plurality of panels further enchancing the insulative effectiveness of the shade in both instances.

6. Thermal insulating shade in accordance with claim 1, wherein said interior surface of the area to be insulated on which the thermal shade is to be mounted in spaced substantially parallel relationship comprises a window.

7. Thermal insulating shade in accordance with claim 1, wherein said interior surface of the area to be insulated on which the thermal shade is to be mounted in spaced substantially parallel relationship comprises a roof.

8. Thermal insulating shade in accordance with claim 1, wherein said interior surface of the area to be insulated on which the thermal shade is to be mounted in spaced substantially parallel relationship comprises a vehicle windshield.

9. Thermal insulating shade in accordance with claim 6, wherein said window comprises a vehicle window.

* * * * *